United States Patent [19]
> Zeijlstra

[11] 4,338,200
[45] Jul. 6, 1982

[54] PROCESS FOR THE REMOVAL OF HEAVY METALS FROM AQUEOUS LIQUIDS

[75] Inventor: Foeke Zeijlstra, Oss, Netherlands

[73] Assignee: Akzo N.V., Netherlands

[21] Appl. No.: 173,632

[22] Filed: Jul. 30, 1980

Related U.S. Application Data

[63] Continuation of Ser. No. 16,170, Feb. 28, 1979, abandoned.

[30] Foreign Application Priority Data

Feb. 25, 1978 [NL] Netherlands ..................... 7802123

[51] Int. Cl.³ .............................................. C02F 1/52
[52] U.S. Cl. ................................... 210/724; 75/108; 210/737; 210/912; 210/913; 423/55; 423/92; 423/104
[58] Field of Search ........ 210/702, 709, 720, 723–728, 210/737, 738, 912–914; 423/55, 92, 104; 75/108, 109

[56] References Cited

U.S. PATENT DOCUMENTS

| | | | |
|---|---|---|---|
| 140,721 | 6/1873 | Milner | 423/93 |
| 652,072 | 6/1900 | Bechi | 423/94 |
| 1,409,727 | 3/1922 | Kardos | 204/112 |
| 2,530,616 | 11/1950 | Kingsbury et al. | 423/55 |
| 2,725,314 | 11/1955 | Lancy | 134/13 |
| 3,453,072 | 7/1969 | Vian-Ortuno et al. | 423/104 |
| 3,575,853 | 4/1971 | Gaughan et al. | 210/913 |
| 3,784,666 | 1/1974 | Elges et al. | 423/43 |
| 3,931,007 | 1/1976 | Sugano et al. | 210/722 |
| 3,950,131 | 4/1976 | Young | 210/913 |
| 3,961,029 | 6/1976 | Senoo | 423/54 |
| 4,045,340 | 8/1977 | Perrone | 423/55 |
| 4,048,283 | 9/1977 | Lee | 423/92 |
| 4,108,596 | 8/1978 | Hemming et al. | 423/55 |

FOREIGN PATENT DOCUMENTS

| | | | |
|---|---|---|---|
| 599986 | 6/1934 | Fed. Rep. of Germany . | |
| 2640096 | 5/1977 | Fed. Rep. of Germany . | |
| 50-79169 | 6/1975 | Japan | 210/912 |
| 678462 | 9/1952 | United Kingdom . | |
| 239292 | 7/1969 | U.S.S.R. | 423/92 |

OTHER PUBLICATIONS

Culp et al. "Heavy Metal Removal" *New Concepts In Water Purification*, 1974, pp. 218–223.
*Galvanotechnik*, 64, No. 5, 1973, pp. 366–369.

*Primary Examiner*—Peter A. Hruskoci
*Attorney, Agent, or Firm*—Stevens, Davis, Miller & Mosher

[57] ABSTRACT

The invention relates to a process for the removal of heavy metal ions, particularly chromium, lead and/or zinc ions, from aqueous liquids by precipitation wherein the aqueous liquid containing the heavy metal ions and an aqueous liquid containing a base which precipitates the heavy metal ions in the form of their hydroxide or basic salt are added simultaneously to an amount of water at a pH between 5 and 10 and a temperature between 60° and 100° C. and the pH and the temperature are maintained in the specified ranges during the precipitation.

7 Claims, No Drawings

PROCESS FOR THE REMOVAL OF HEAVY METALS FROM AQUEOUS LIQUIDS

This is a continuation of application Ser. No. 16,170, filed Feb. 28, 1979, now abandoned.

The invention relates to a process for the removal of heavy metals from aqueous liquids which contain the metals in ionic form. In particular, the invention relates to the removal of chromium, zinc and/or lead from effluent discharge.

BACKGROUND OF THE INVENTION

Effluent water containing metal ions such as chromium, lead and zinc ions, is discharged in many branches of industry. In the galvanizing industry, washing after various chemical and electrochemical processes for the surface treatment of metals is the most important cause of the presence of heavy metal ions, for example chromium, silver, cadmium, iron, copper or nickel ions, in effluent water. Effluent water containing chromium compounds is discharged by tanneries. Mercury ions are found in effluent discharges from mercury-electrolysis factories. In the organic process industry, where for example oxidations with chromic acid or lead acetate and reductions with zinc are performed, effluent water containing chromium, lead and/or zinc ions is discharged. This effluent water from the organic process industry contains a relatively large amount of metal ions, for example chromium from 1 to 5% by weight and lead to even 10% by weight.

In connection with environmental requirements, the effluent containing heavy metal ions may not be discharged untreated into the sewer or into public waters, so that the indicated route is removal of the metal ions before discharge. Precipitation in the form of metal hydroxides or basic metal carbonates, brought about by the addition of basic substances such as NaOH, CaO, $Ca(OH)_2$, $Na_2CO_3$ and MgO, is therefore a self-evident method.

In practice, the precipitation method is not free from its problems. The precipitates formed, in particular the metal hydroxide, are generally gelatinous and extremely bulky, and because of their colloidal nature they are difficult to remove by filtration. Slurries with a dry matter content of 1% may still be pumped, but when an aqueous slurry has a dry matter content of 5 to 15% it may scarcely be pumped. Filtration of the slurry is also difficult and slow. With the filters which are in general use in the technique, filter-cakes with a dry matter content from approximately 10% to about 20% are obtained.

GENERAL DESCRIPTION OF THE INVENTION

The invention relates to a precipitation method by means of which heavy metal ions are precipitated with the usual bases, such as sodium hydroxide or a soda solution, from aqueous media in the form of hydroxides or basic salts such that the precipitate readily settles, is easy to filter, and a filter cake with a dry matter content of more than 50% is obtained on filtration. The process now found consists of the simultaneous addition with stirring of the aqueous liquid containing the heavy metal ions, and an aqueous liquid containing the base to a certain amount of water with a pH between 5 and 10 and having a temperature between 60° and 100° C., and preferably between 75° and 90° C., whereby during the precipitation the pH of the reaction mixture is maintained at a value between 5 and 10 by adjustment of the rate of both additions and the temperature is furthermore also held in the mentioned range.

This homogenous precipitation at a pH between 5 and 10 and at elevated temperature, with simultaneous dosing of the reactants (the metal ions in the effluent water and the base), such that the concentration of metal ions in solution remains low, leads to a precipitate which settles readily and is easy to filter.

Optimal results are obtained with effluent water containing only one sort of metal ion to be precipitated, for example effluent water which contains as the ion to be removed only chromium ions or only lead ions. In such a case, it is possible to choose the optimal conditions with respect to pH, temperature and concentration, as well as the most suitable base, for each metal ion. In branches of industry where diverse processes in which effluent water containing metal ions is discharged, are carried out, it may be advisable to keep the various effluent flows separate. For example, in oxidation processes with chromic acid, chromium ions must be removed from the effluent, and in oxidation processes involving lead acetate, an effluent from which lead ions must be removed is discharged. These effluent flows may best be treated separately.

Chromium is precipitated as a hydroxide with lye, for example caustic soda. A soda solution is not as suitable in this case, since the chromium carbonate complexes which would be produced may redissolve under certain circumstances. If the effluent contains the chromium as chromate (therefore as hexavalent chromium), this must first be reduced to $Cr^{+++}$. The reduction may for example be performed under acid conditions by addition of a readily oxidized organic compound, such as a lower aliphatic alcohol, for example methanol. Sulphur dioxide may also be used as a reducing agent. Sulphites at a pH of about 2 may furthermore also serve as reducing agents.

The anion present in the effluent may also have an influence on the optimal precipitation conditions, specifically with respect to the pH. Effluent water containing chromium sulphate has been shown to give the best results by the process according to the invention at a pH between 6 and 8, while with an effluent containing chromium acetate, the pH must be higher, and a good result is obtained at a pH between 8 and 10.

Effluent water containing lead ions may best be treated with a soda solution, giving a precipitate of basic lead carbonate, preferably at a pH of about 7. Zinc ions may be precipitated with a base, for example sodium hydroxide, in the form of zinc hydroxide, preferably at a pH of 7–7.5.

The concentration of metal ions in solution in the reaction vessel is low in the process followed, and is in fact determined by the solubility product of the precipitated material under the conditions prevailing. The concentration of metal ions in the effluent water itself may naturally be higher; the simultaneous dosing of effluent water and base to a bulk of water leads primarily to a dilution effect. Under the conditions chosen, the reaction rate is greater than the rates of addition of effluent water and the base, so that the metal ion concentration in the reaction vessel remains low (order of magnitude: 1–10 ppm).

The residual solubilities achievable by the known precipitation methods (for chromium $\leq 2$ ppm; for lead and zinc $\leq 3$ ppm) can also be achieved by the process according to the invention.

If the concentration of metal ions in the effluent water is very high (above 10% w/w), it is better to dilute the effluent to a concentration below 10% w/w before processing.

The local occurrence of concentrations which are too high in the reaction vessel should be avoided since this would have an unfavourable effect on the homogeneous precipitation. Adequate stirring of the reaction mixture is naturally important.

The rate of addition of effluent water with a metal ion concentration up to 5% w/w for $Cr^{+++}$ and $Zn^{++}$ and up to 10% w/w for $Pb^{++}$ may vary within wide margins. Rates between 0.1 and 5 liter/sec/m$^3$ reaction mixture are applicable. The rate of addition of the base is adjusted to this via measurement of the pH. Continuous monitoring of the pH is recommended so that it may be adjusted in good time by changing the addition rate.

Globally, the process is implemented as follows: A certain amount of water is introduced into a reaction vessel. The vessel is provided with a stirrer, heating, a thermometer, a pH meter, an inlet for introducing effluent and an inlet for introducing the base, such that the two inlets are preferably situated as far from each other as possible, as well as an outlet for the resultant slurry to a filter (a centrifugal filter or a filter press). The heating may consist of mantle heating, or of a heating coil (electrically or steam heated) in the vessel, or optionally of free steam which is passed into the reaction mixture.

The bulk of water is adjusted to the required pH with a little acid or base and adjusted to a temperature between 60° and 100° C., preferably between 75° and 90° C. The effluent water and the base are then simultaneously added under conditions which have been indicated above, such that the pH and the temperature are maintained in the required range.

If the vessel is full, addition of base and effluent water is stopped, and the aqueous slurry of precipitate obtained is pumped to a filter. After filtration, the filtrate is monitored for metal ion content, and if it meets the requirements for discharge it may then be discharged into the sewer. The filter-cake is removed to a dump for chemical waste, or optionally to a recovery plant for reclaiming the metal or to the heavy ceramics industry for use as a pigment.

The process may also be utilized as a continuous process, that is, the effluent and base are introduced from above into a practically full and stirred vessel and slurry is removed from below, whereby the rates of addition and removal are related to each other in such a way that the level in the vessel is maintained and the time that the reaction mixture remains in the vessel is sufficiently long for formation of the precipitate.

The invention is illustrated by means of the following examples.

EXAMPLE I (a) 0.5 liter water (pH=7) was introduced into a 5 liter round-bottom flask provided with a stirrer, a thermometer, a pH-meter, an inlet-pipe for a solution containing heavy metal ions and an inlet-pipe for base. The contents of the flask were heated to 85° C. While the contents of the flask were stirred, a solution of chromium sulphate (3% by wt/liter; pH=1.5) was then added at a rate of 2 ml per second through one inlet tube, and sodium hydroxide solution (33% w/w) was added through the other inlet at such a rate that the pH of the mixture in the flask could be maintained at 7. The temperature was held at 85° C. A precipitate of chromium hydroxide was formed. After about 30 minutes the addition of both chromium sulphate solution and lye was stopped. The flask then contained about 4.5 liters chromium hydroxide slurry. After stirring ceased, the precipitate readily settled. Filtration through a Büchner funnel was facile and resulted in a filter-cake with a dry matter content of about 85% w/w.

The residual content of chromium in the filtrate: 2 ppm.

(b) A chromium acetate solution (5% by wt/liter; pH 3.5) was treated in a similar way but the pH of the mixture in the flask was adjusted to 9.2 and maintained at this value. The result was a precipitate which could be readily separated by filtration. Dry matter content of the filter-cake: about 80% w/w. Residual chromium concentration of the filtrate: 2 ppm.

(c) A zinc sulphate solution (4% by wt/liter; pH 1.5) was treated with lye in a similar way, with the pH of the mixture in the flask adjusted to 7.1. A precipitate of $Zn(OH)_2$ was obtained which was readily separated by filtration. Dry matter content of the filter-cake about 75% by weight. Residual zinc concentration of the filtrate: 3 ppm.

(d) A lead acetate solution (15% by wt/liter; pH=5) was treated in a similar way at a pH of 7.1 with a saturated solution of $Na_2CO_3$. A precipitate of basic lead carbonate was obtained which was readily separated by filtration. Dry matter content of the filter-cake about 95% w/w. Residual lead concentration of the filtrate: 3 ppm.

EXAMPLE II (a) For continuous precipitation performed on an industrial scale, use was made of a reaction vessel of 600 liters, provided with a stirrer, an inlet pipe for the solution of heavy metal salts, an inlet pipe for the base, an inlet pipe for steam, a temperature monitoring and control system which controls the closure valve of the steam inlet pipe in such a way that a previously selected temperature is maintained, a pH monitoring and control system by means of which the pH of the reaction mixture is maintained at a previously set value by adjusting the rate of addition of the lye; an outlet pipe, provided with a pump, for removal of the slurry to a centrifugal vacuum filter and a level control system which controls the addition of the solution of heavy metal salts according to the level.

The reaction vessel was filled with 200 liters water, which was heated to a temperature of 80° C. by passing in steam. The pH monitoring and control system was set at 7.2. The stirrer was started, after which addition of a zinc sulphate solution (pH=2) containing 5% w/v commenced. At the same time, addition of lye (33% NaOH w/w) was started, whereby the rate of addition was further controlled by the pH control system. The temperature monitoring and control system controlled the amount of steam injected in such a way that the temperature was maintained at 80° C.

The level control system was set to 500 liters. When the contents of the vessel reached this volume, the value of the outlet pipe was opened and slurry was then continuously pumped into the trough of the centrifugal vacuum filter (filter surface 2.6 m$^2$). The valve of the outlet pipe was also controlled by the pH control system so that only slurry with the set pH value was discharged.

In this way, the zinc sulphate solution was treated continuously at a mean rate of 1000 liters per hour, with a lye consumption of about 65 liters 33% sodium hydroxide per hour. The filter-cake peeled from the centrifugal vacuum filter and a dry matter content of about 60% w/w.

(b) A solution of lead acetate (pH=5; 15% w/v) was treated in a similar way at a pH of 7 and a temperature of 85° C. with a saturated soda solution. Mean rate: 900 liters lead acetate solution per hour; soda consumption about 90 kg $Na_2CO_3$ per hour. Dry matter content of filter-cake: 85% w/w.

(c) In a similar way, a solution of chromium sulphate (pH=1; 3% w/v) was treated with 33% sodium hydroxide solution at a pH of 7 and a temperature of 85° C. Mean rate: 1000 liters chromium sulphate solution per hour; lye consumption: about 100 liters per hour. Dry matter content of filter-cake: 70% w/w.

(d) In a similar way, a solution of chromium acetate (pH=3; 6% w/v) was treated with 33% sodium hydroxide solution at a pH of 9.2 and a temperature of 90° C. Mean rate: 500 liters chromium acetate solution per hour; lye consumption: about 120 liters lye per hour. Dry matter content of the filter-cake: 65% w/w.

(e) When the temperature was slowly allowed to fall during the performance of the processes described above, it was noted that ease of filtration deteriorated noticeably below 75° C. The result was still acceptable at a temperature of 60°–65° C., though the water content of the filter-cake had risen by a considerable percentage. Below 60° C., obvious problems were experienced with pumping and filtering of the slurry, and at 50° C. an unmanageable gelatinous precipitate was formed.

I claim:

1. A process for homogeneously precipitating heavy metal ions selected from the group consisting of chromium ions, zinc ions, and lead ions from aqueous liquids containing same consisting essentially of separately but simultaneously adding (1) an aqueous liquid containing said heavy metal ions in the form of a heavy metal salt selected from the group consisting of chromium sulphate, zinc sulphate, and lead sulphate and (2) an aqueous liquid containing a base that precipitates the heavy metal ion of said heavy metal salt in the form of its hydroxide or basic salt to a quantity of water that (a) is being stirred, (b) has a pH between 5 and 10, and (c) is at a temperature ranging from about 60° C. to about 100° C. to cause homogeneous precipitation of the heavy metal hydroxide or basic salt, wherein the pH of the resulting solution is maintained between 6 and 8 by adjusting the rates of addition of aqueous liquid (1) and aqueous liquid (2) and wherein the temperature is held within the range from about 60° C. to about 100° C. during the homogeneous precipitation, and separating the precipitated heavy metal hydroxide or basic salt from the resulting solution.

2. Process according to claim 1 wherein the heavy metal salts are selected from the group consisting of chromium sulfate and zinc sulphate and the base is a hydroxide.

3. Process according to claim 1 wherein the heavy metal salt is lead sulphate and the base is a carbonate solution.

4. Process according to claim 1 wherein the temperature is maintained between 75° and 90° C.

5. Process according to claim 1 wherein the rate of addition of the aqueous liquid containing the heavy metal ions is in the range of about 0.1 to about 5 liters per second per $m^3$ reaction mixture.

6. A process for homogeneously precipitating chromium ions from aqueous liquids containing same consisting essentially of separately but simultaneously adding (1) an aqueous liquid containing said chromium ions in the form of chromium acetate and (2) an aqueous liquid containing a base that precipitates the chromium ion in the form of its hydroxide or basic salts to a quantity of water that (a) is being stirred, (b) has a pH between 5 and 10, and (c) is at a temperature ranging from about 60° C. to about 100° C. to cause homogeneous precipitation of the chromium hydroxide or basic salt, wherein the pH of the resulting solution is maintained between 8 and 10 by adjusting the rates of addition of aqueous liquid (1) and aqueous liquid (2) and wherein the temperature is held within the range from about 60° C. to about 100° C. during the homogeneous precipitation, and separating the precipitated chromium hydroxide or basic salt from the resulting solution.

7. Process according to claim 6 wherein the pH 5 is maintained between 7 and 7.5.

* * * * *